United States Patent [19]
Gueldenpfennig et al.

[11] 3,903,373
[45] Sept. 2, 1975

[54] COMBINED OPERATOR CONTROLLED DIAL-UP CONFERENCE FOR PBX

[75] Inventors: Klaus Güeldenpfennig, Penfield; Robert F. Pedrick, Rochester, both of N.Y.

[73] Assignee: Stromberg-Carlson Corporation, Rochester, N.Y.

[22] Filed: Apr. 17, 1973

[21] Appl. No.: 352,001

[52] U.S. Cl. .......................... 179/18 BC; 179/1 CN
[51] Int. Cl.$^2$ .......................................... H04M 3/56
[58] Field of Search ...................... 179/18 BC, 1 CN

[56] References Cited

UNITED STATES PATENTS

| | | | |
|---|---|---|---|
| 3,322,901 | 5/1967 | Trimmer | 179/27 |
| 3,660,610 | 5/1972 | Hestad et al. | 179/18 BC |
| 3,671,759 | 6/1972 | Dopheide | 179/18 F |
| 3,781,483 | 12/1973 | Deisch | 179/18 F |

*Primary Examiner*—Kathleen H. Claffy
*Assistant Examiner*—C. T. Bartz
*Attorney, Agent, or Firm*—Donald R. Antonelli; William F. Porter, Jr.

[57] ABSTRACT

A conference circuit for a private automatic branch exchange wherein the conference may be established and controlled either by the operator or by a subscriber on a dial-up basis. Provision is also made for connecting incoming trunk calls into the conference at a selected trunk port. In addition, provision is made for switching control over the conference from the initiating party to the second party when the initiating party releases.

3 Claims, 13 Drawing Figures

PATENTED SEP 2 1975 3,903,373

SHEET 2

COMBINED OPERATOR CONTROLLED DIAL-UP CONFERENCE FOR PBX

The present invention relates in general to telephone systems, and more particularly to a conference circuit for private automatic branch exchanges wherein conference connections may be established by one of the parties on a dial-up basis or by the operator.

Several different types of conference arrangements have been provided for private branch exchange systems, including the dial-up conference arrangement, the operator initiated conference arrangement and the meet-me type facility. In the dial-up conference arrangement, any subscriber within the system may establish a conference connection with a plurality of other subscribers within the system by dialing or keying a particular digit to obtain access to the conference circuit and then by successively dialing or keying the numbers of the parties to be placed on the conference call with alternate hookflashing to sequentially switch the parties into the conference. In the operator initiated conference arrangement, the conference connection between a plurality of subscribers is set up under the control of the operator, who successively dials or keys selected subscribers onto dedicated conference lines connected to a conference bus to thereby place each subscriber in connection with the conference circuit. In the meet-me type conference arrangement, respective parties independently dial-up to the conference circuit after having prearranged with each other for establishment of the conference call, and therefore, meet at the conference bus.

The present invention serves to combine the features of the dial-up conference arrangement and the operator controlled conference arrangement, thereby to provide what may be considered a more universal type conference system in connection with private automatic branch exchanges. In the system provided in accordance with the present invention, a conference communication may be initiated and controlled either by a subscriber within the system on a dial-up basis or by the operator, thereby providing a more versatile system. However, the dial-up and operator initiated operations are mutually exclusive in that once the operator takes control by initiating the conference, a party may not thereafter control the conference.

One of the features of the present invention relates to the provision of means to automatically switch control from the initiating party to another party in the conference to permit the original party to release if desired. However, if both the initiating party and the second party in the conference release in the absence of an operator in the conference, the conference will release.

The conference arrangement of the present invention provides for the connection of incoming trunks to the conference by provision of two trunk ports. Thus, a party outside of the system may dial into the operator to request that a conference be set up between various subscribers within the system and the operator can connect the outside trunk line into the conference circuit and then add the other parties requested.

In the system of the present invention, the party initiating the conference and the additional conferees as well as the operator are connected to a four wire conference arrangement through a two-to-four wire hybrid conversion via a matrix including a common bus which serves to connect the party initiating the conference, i.e., the operator or a subscriber, selectively and sequentially to respective lines extending to the exchange to bring the parties one at a time into the conference circuit. Conference control logic circuitry is provided which allows the initiating party to control the conference connection by dialing, keying, or hookflashing. Suitable circuitry is also provided to control lamp indication at the operator console concerning the status of the conference circuit and requests for recall to the operator.

The principal object of the present invention is to provide a conference facility for a private automatic branch exchange which permits establishment of the conference communication either on a dial-up basis by one of the subscribers or on an operator initiated basis.

It is another object of the present invention to provide a conference facility for a private automatic branch exchange which is extremely versatile in the manner in which conference communications may be set up, controlled, and modified, while requiring relatively simple circuitry.

A further object of the present invention is to provide a conference facility which is applicable to substantially any exchange equipment since it requires only single line circuit termination per conference port as an interface into the exchange.

These and other objects, features, and advantages of the present invention will become more apparent from the following detailed description, when taken in conjunction with the accompanying drawings, wherein.

Figure 9:
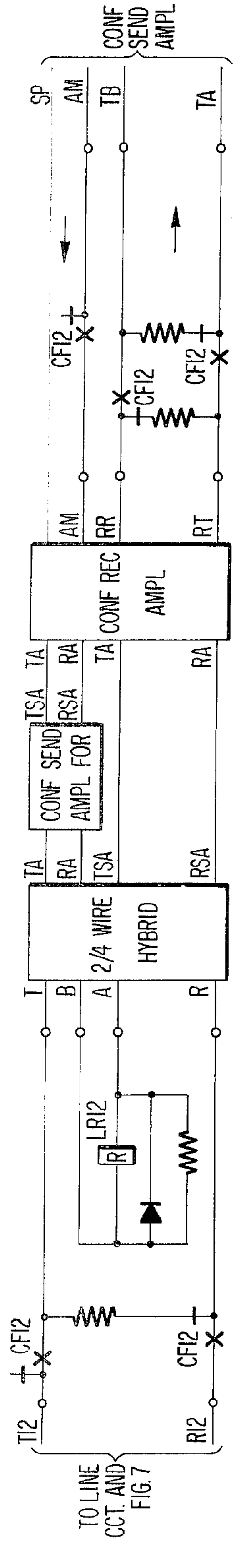
Figure 10:
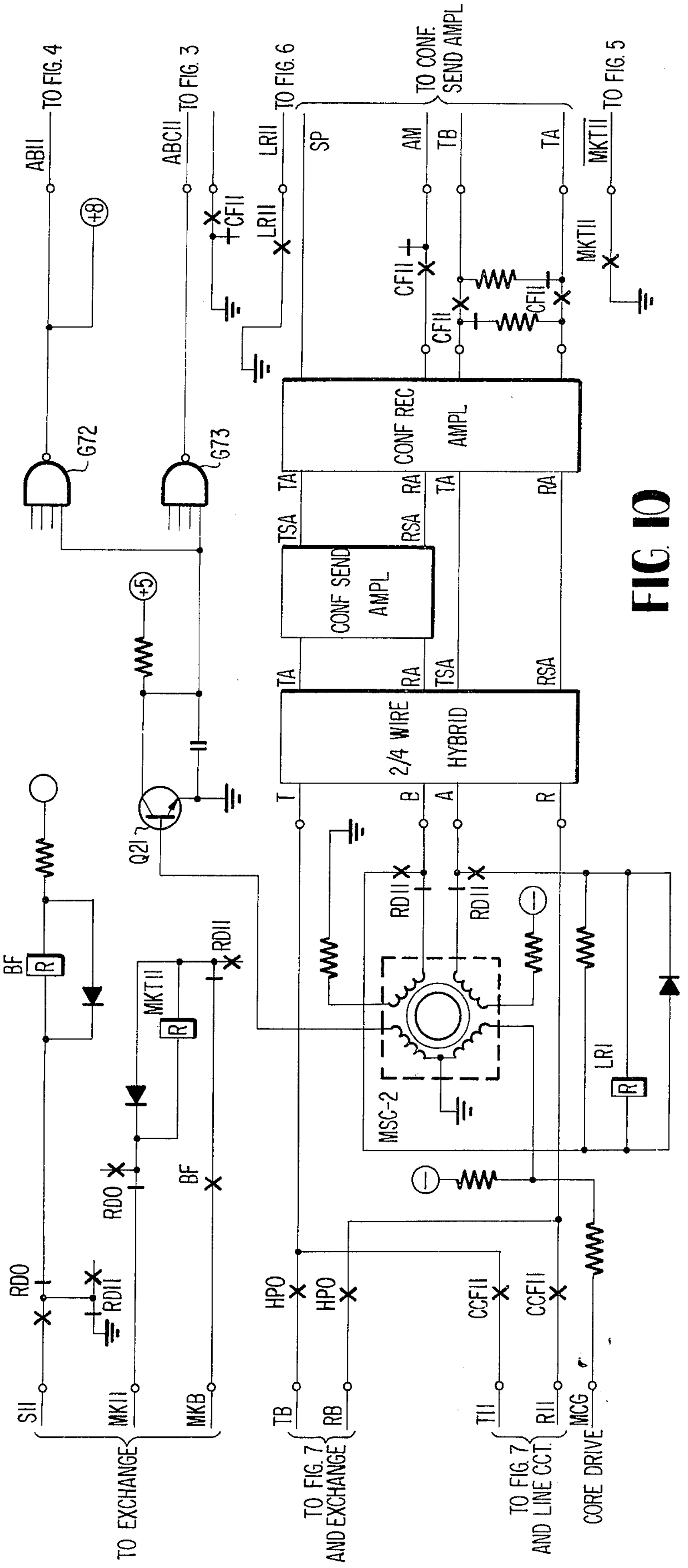
Figure 11:
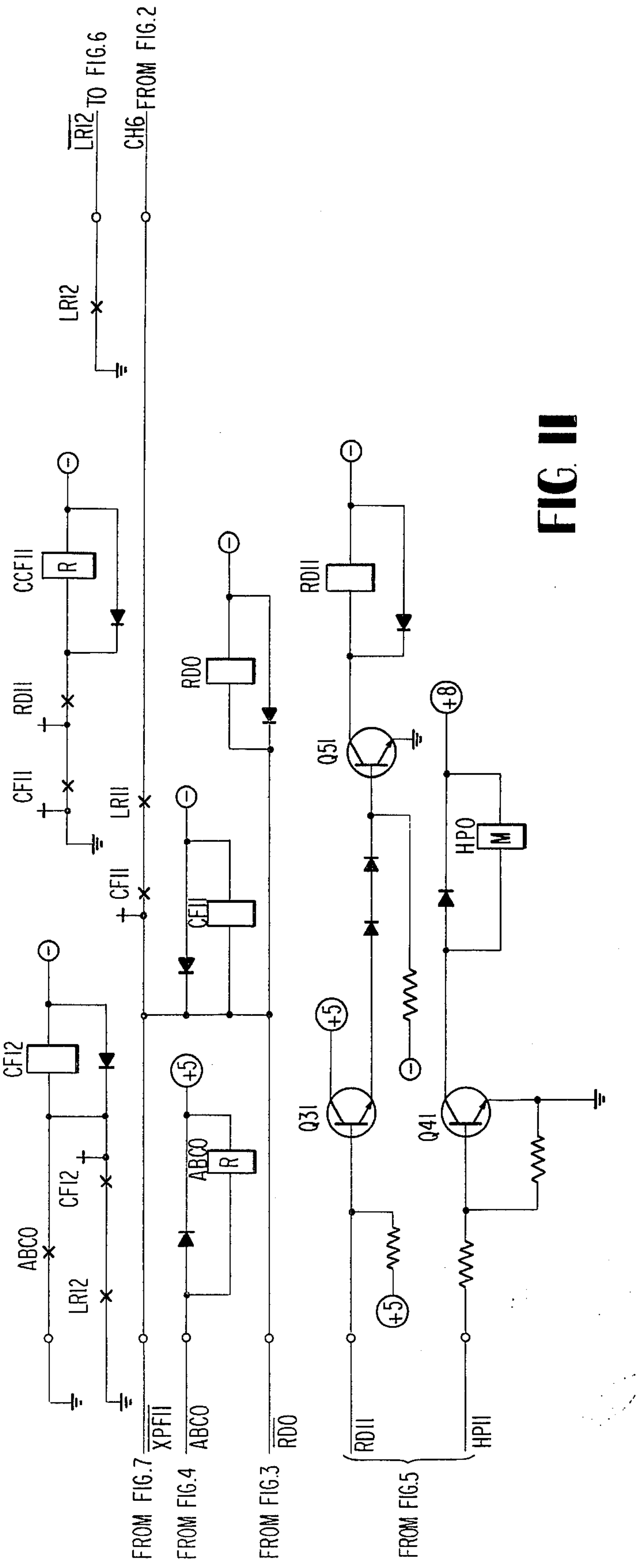
Figure 12:
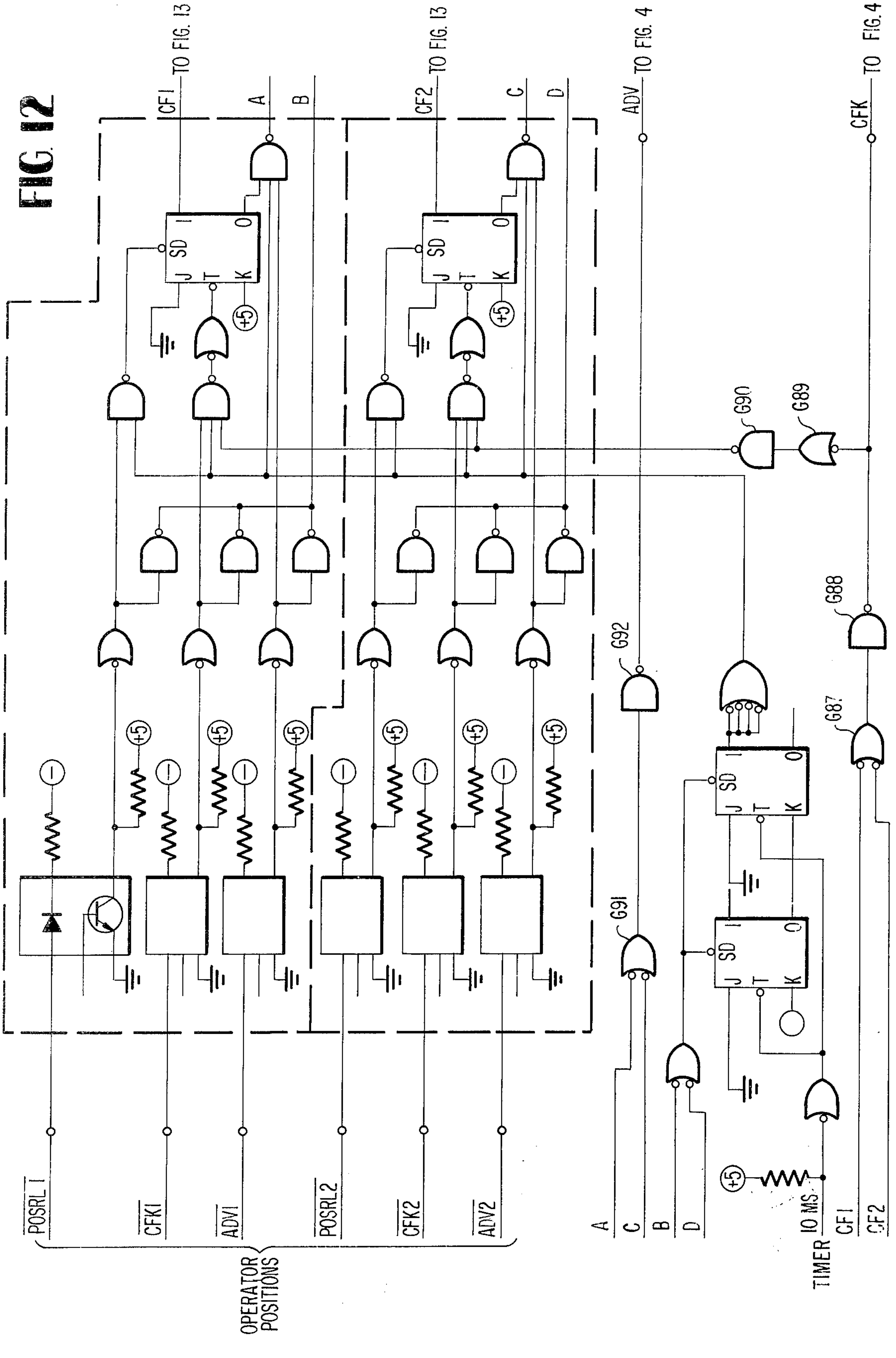
Figure 13:
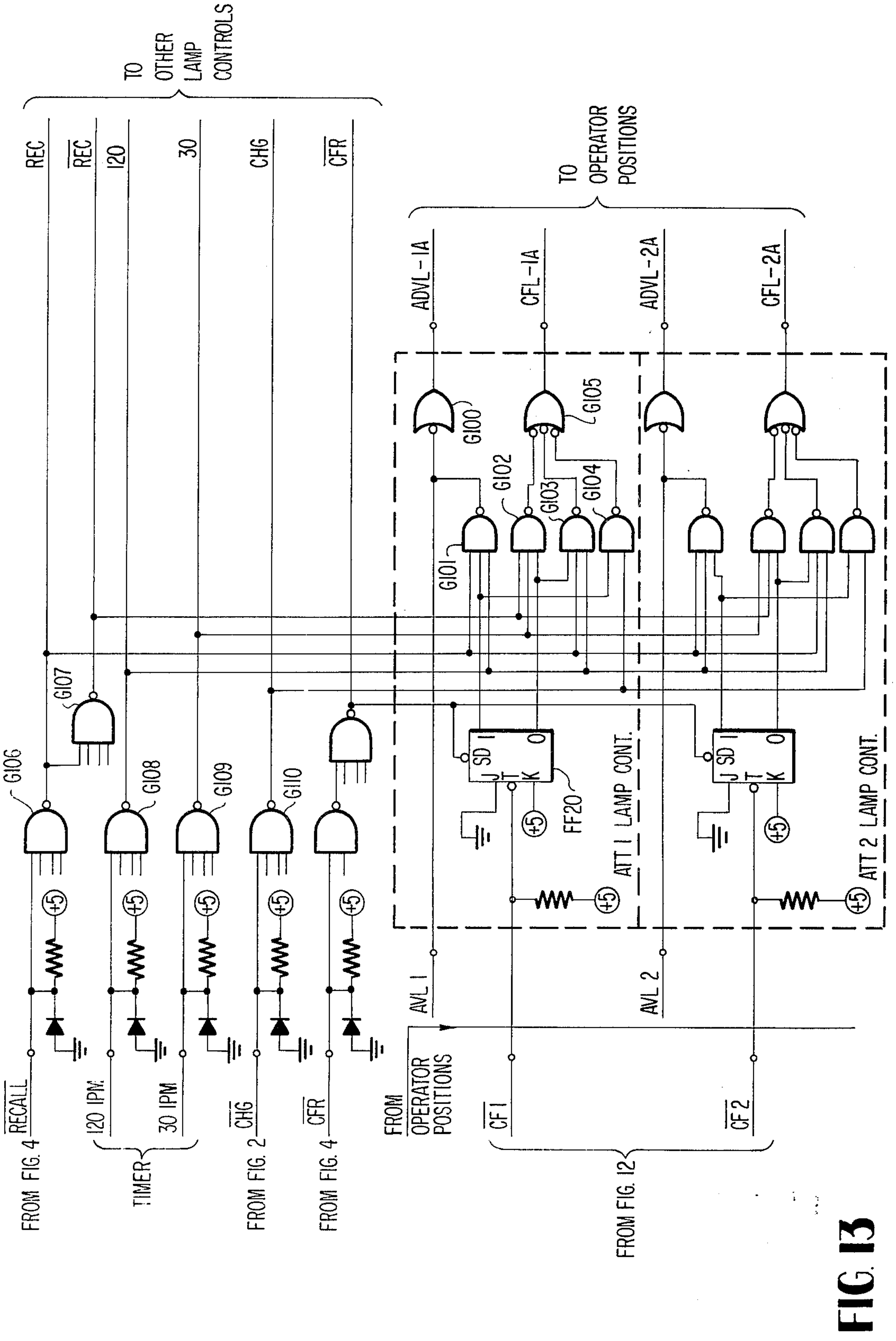

FIGS. 9, 10, and 11 are schematic circuit diagrams illustrating the conference port interface;

FIG. 12 is a schematic circuit diagrams illustrating a portion of the operator conference key interface; and FIG. 13 is a schematic circuit diagram illustrating a portion of the operator conference lamp control.

A typical private automatic branch exchange of the type to which the present invention is applicable is disclosed in copending application Ser. No. 293,518, now U.S. Patent No. 3,859,474 filed Sept. 29, 1972, by Uwe A. Pommerening, Klaus Gueldenpfennig, and Stanley L. Russell, which application is assigned to the same assignee as the present invention. However, it should be apparent from the following disclosure that the present invention is generally applicable to any private automatic branch exchange, which is one of the important features of the present invention. While the system disclosed in the aforementioned copending application is a facility which includes a plurality of operators, and while the present invention is clearly applicable to such a system, it will be quite obvious from the following disclosure that the conference system of the present invention can also be provided in those private automatic branch exchanges wherein only a single operator is provided.

Figure 1:
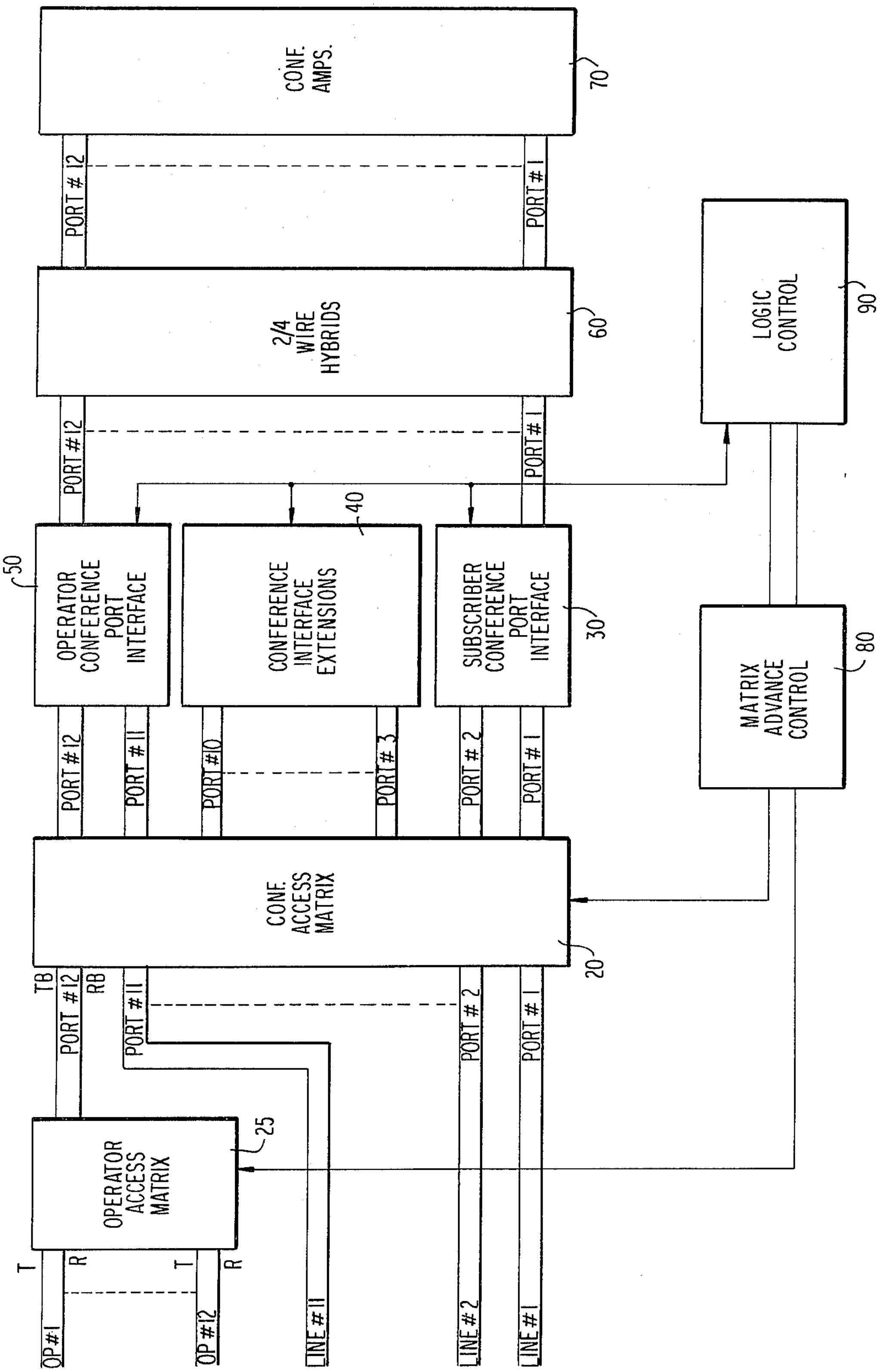
FIG. 1 is a schematic block diagram of the basic conference facility of the present invention.

Referring to the basic block diagram of FIG. 1, the conference facility of the present invention includes a conference access matrix 20 having, for example, twelve ports with ports No. 1 through No. 11 extending to line circuits forming an interface with the exchange, while port 12 is dedicated to the operator positions. An operator access matrix 25 serves to connect a single one of, for example, twelve operator positions to port No. 12.

The conference access matrix 20 serves to selectively connect the ports to one another to access the other conferees and provide for communication between the party or operator establishing the communication connection and the other conferees prior to tieing the conferees into the conference connection. The conference access matrix 20 also serves as a means to connect a dummy load to the various ports on a selected basis under the control of party or operator establishing the conference communication to provide to the line circuit connected to that port the appearance of an off-hook condition thereby permitting return of dial tone and the dialing of a party to bring that party into the conference connection.

Ports No. 1 and No. 2 of the conference access matrix 20 are provided for parties initiating and controlling the conference connection during the dial-up operation, and therefore, a special conference interface 30 is provided between these ports and the conference hybrids 60 to provide the necessary logic functions which enable the establishing of the conference. In a similar manner, port No. 12 is dedicated to initiation of an operator controlled conference, while port No. 11 serves as a trunk port to which a trunk may be connected by the operator, and therefore, a conference port interface 50 is connected to these ports to permit the operator to establish and control the conference connection. Standard conference port interface extensions are provided between ports No. 3 through No. 10 and the conference hybrid 60, no control over the conference connection being provided from these ports.

The conference hybrids 60 connect the parties to the conference amplifiers and include a typical two-to-four wire hybrid conversion. The conference hybrids 60 and conference four wire amplifier arrangement 70 is disclosed more fully in U.S. Pat. No. 3,622,708, issued to John H. Guenther and Klaus Gueldenfennig on Nov. 23, 1971, this patent being assigned to the same assignee as the present invention.

A conference matrix advance control 80 is connected to the conference access matrix 20 to sequentially access the next available port in the process of establishing a conference connection between a plurality of subscribers. For example, when the conference is being established by a subscriber connected to port No. 1, the conference matrix advance control 80 will access the ports of the conference access matrix in numerical sequence starting with port No. 2. Where a plurality of ports have been occupied and an intermediate port becomes free due to a subscriber dropping out of the conference, a further subscriber added as a conferee will be connected to that free intermediate port by the conference matrix advance control 80 since the first available port in numerical sequence will always be selected.

The conference logic control 90 serves as a means of controlling the conference port interface 30, the conference port interface extensions 40 and the operator conference port interface 50, as well as the conference matrix advance control 80. The conference logic control 90 includes a flash detection control circuit, which monitors hookflashes by the controlling subscriber to thereby initiate the various logic operations required to establish and maintain the conference connection. This detection circuit also monitors release by the controlling subscriber in the same manner so as to initiate a transfer of control to the second party, as well as requests for entry of the operator into the conference to initiate a recall operation.

In general, when a subscriber wishes to establish a communication with a plurality of other subscribers within the system, he may accomplish this either by dialing up the conference himself or by requesting the operator to set up the conference. If he should decide to set up the conference himself on a dial-up basis, he will first dial a prescribed digit which is dedicated to the dial-up operation, and this digit will be recognized in the exchange as a request for access to the conference circuit. The exchange will then proceed to connect the subscriber line circuit to port No. 1 of the conference matrix and the corresponding port No. 1 of the conference port interface, which includes a core sensor associated with port No. 1. A conference tone is then returned to the subscriber indicating that he has been connected to the conference circuit. The subscriber then flashes his switch hook for the first time, which condition is detected in the conference port interface 30 and forwarded to the conference logic control 90. The conference logic control 90 then actuates the conference matrix advance control 80 to enable port No. 2 and to connect the dummy load to the bus in the conference access matrix so that the line circuit connected to port No. 2 detects an off-hook condition. Dial tone is then returned through port No. 2 to port No. 1 and the subscriber may then proceed to dial the number of the second conferee. When the second conferee responds, communication between the two parties may take place through the conference access matrix with the initiating party indicating that a conference is being set up and requesting that the second party remain on the connection. The initiating party then flashes his switch hook for the second time, which condition is detected again in the conference port interface 30 and conference logic control 90. As a result, the conference access matrix 20 and the conference port interface 30 are actuated to extend ports No. 1 and No. 2 through to the conference hybrids 60 and four wire conference amplifier 70.

The initiating party may then flash his switch hook once again, in which case the conference logic control 90 will disconnect port No. 1 from the conference hybrids 60 and operate the conference matrix advance control 80 to enable port No. 3 and to connect the dummy load thereto. Dial tone is once again returned and the same operations are carried out to effect connection of the third conferee to the conference hybrids 60 through the conference access matrix 20 and a conference port interface extension 40.

The operator initiated conference is established and controlled by a conference key and advance key at the operator console. When the operator depresses the conference key at her console, the operator access matrix 25 will connect the operator to port No. 12 of the conference access matrix 20. The advance key at the operator console generates a signal similar to a subscriber hookflash permitting the operator to be connected from port No. 12 to the other ports of the conference access matrix in sequential order as determined by the conference matrix advance control 80. Thus, the operator can with successive operation of the advance key and dialing or keying the subscriber numbers of the other conferees connect the conferees through the conference access matrix to the conference equipment. Port No. 11 is a trunk port in the conference access matrix 20 and permits the operator to connect an incoming trunk line into the conference by dialing or keying an access digit or group of digits designating port No. 11.

Once the conference is set up, the operator will release from the conference; however, the operator can be recalled by a hook switch flash by the subscriber connected to port No. 1 for the purpose of adding additional conferees. The operator interface equipment provides lamp control circuitry which indicates to the operator console whether the operator has initiated the conference call, whether a recall of the operator is required, and whether the conference circuit is occupied.

DIAL-UP CONFERENCE

Description will first be made of the procedures involved in establishing a conference connection initiated on a dial-up basis by one of the subscribers.

When party A desires to establish a conference call, he will dial a special conference number which will be recognized in the exchange. Accordingly, the trunk marker in the exchange will apply ground to a lead MKB in FIG. 2 to the conference port interface and a mark will be applied from the trunk line network in the exchange on lead MK1 so that the relay MKT is operated. Ground is then applied through the contacts of the MKT relay on lead MKTL to FIG. 5 to set the mark flip-flop FF1, thereby providing a signal HPD at the output of gate G1, as well as a signal $\overline{\text{HPD}}$. The signal HPD is applied in FIG. 2 to the conference port interface where it operates transistor Q5 to actuate the relay HP. Thus, the contacts of the HP relay in the lines TB1 and RB1 extending to the trunk link network in the exchange connect party A through the two-to-four wire hybrid 60 to the core sensor MCS1 associated with port No. 1. Relay HP is needed to provide for dry switching (no current) of the matrix the conference is accessed through.

Upon connection of party A to port No. 1, the core sensor MCS1 will produce an output AB1 to operate transistor Q1 and thereby place a ground through gate G2 to operate the relay ABCT1. Operation of the relay ABCT1 in turn causes operation of the relay RD, whose contacts connect ground to the sleeve lead S1, thereby holding the connection of the conference circuit to the trunk-link network, as well as disconnecting ground from the busy/free relay BF, thereby preventing further marking on the lead MKB from the trunk marker to acquire the conference circuit.

Figure 5:
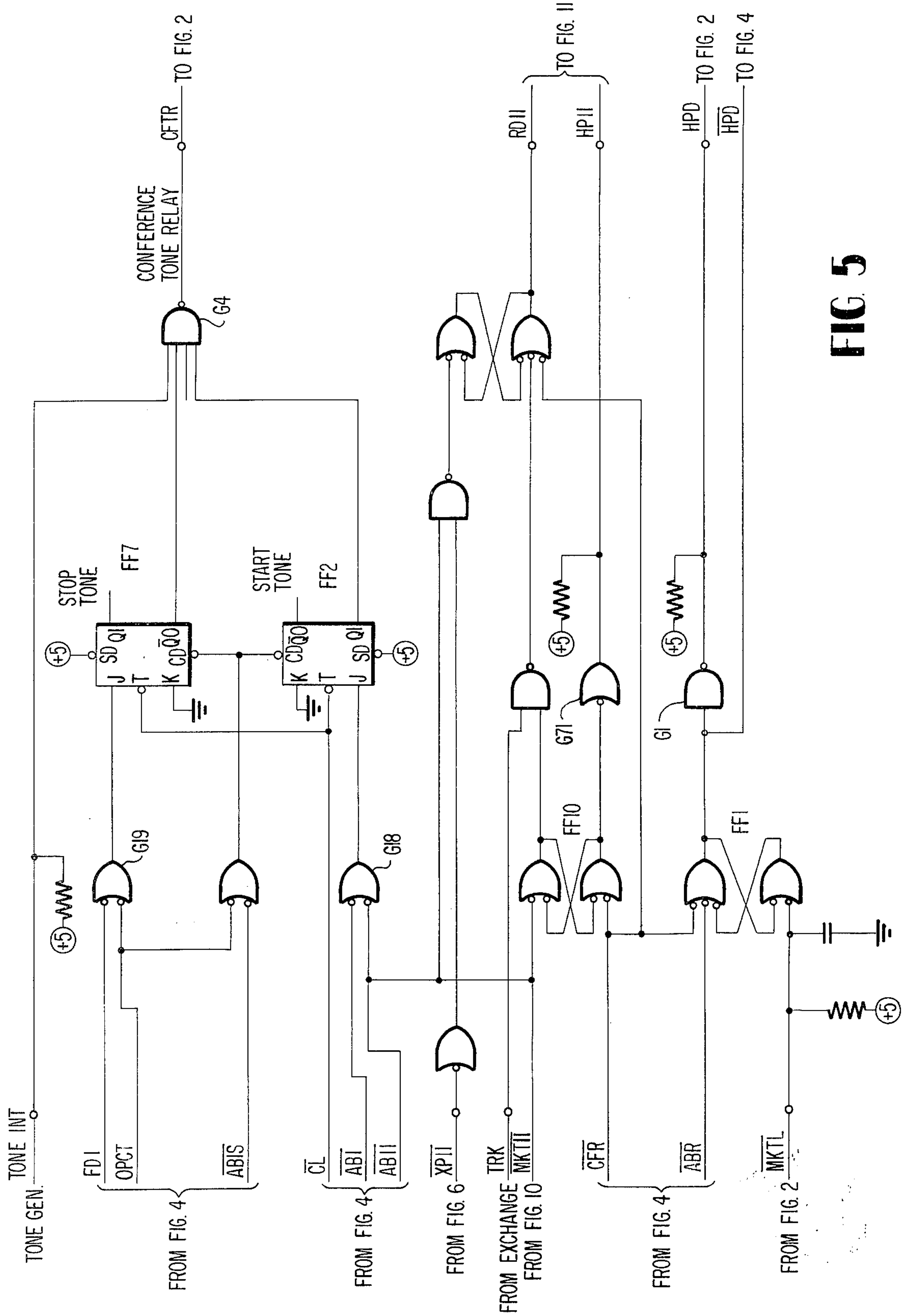

Operation of the transistor Q1 upon connection of party A to port No. 1 of the conference circuit also causes generation of a signal $\overline{\text{AB1}}$ at the output of gate G3, which at this time, serves to set the start tone flip-flop FF2 in FIG. 5 to produce a signal CFTR at the output of gate G4. This signal is applied to the conference port interface (FIG. 2) to operate the CFT relay. As a result, conference tone from the tone distributor (not shown) is applied through closed contacts of the CFT relay to the ring lead R1, thereby providing a conference tone to party A, indicating that he has been connected to the conference trunk.

When party A bears the conference tone, he flashes his hook switch to proceed with the setting up of the conference call. The flashing of the switch hook is detected by the core sensor MCS1 so that the signal $\overline{\text{AB1}}$ at the output of gate G3 follows the flashing. The signal $\overline{\text{AB1}}$ is applied in FIG. 4 through gate G5 to operate gate G6 in time with the clock signals CL applied through gate G7 to switch flip-flop FF3 at the frequency of the clock signals. The output of the flip-flop FF3 is applied to the flash detection control FDC, along with 20 and 200 millisecond timing signals obtained from the system timer (not shown). The period of the signal $\overline{\text{AB1}}$ is detected in the flash detection control, which determines whether the signal is a dial pulse, a flash, or an on-hook signal indicating release.

If a flash is detected, a signal FL is provided from the flash detection control FDC to the input of gate G8. The signal $\overline{\text{AB1}}$ is also applied through gates G9 and G10 to a second input of gate G8 providing an output to gate G11 which also receives the output Q1 of the normally set operator flip-flop FF4, indicating that the operator is not in the conference. The output of gate G11 sets the flash control flip-flop FF5 and also generates a signal $\overline{\text{ENS}}$ by enabling gate G12 via gate G13. The second input to gate G12 is enabled from the reset output $\overline{\text{Q0}}$ of the flash control flip-flop FF5.

The signal $\overline{\text{AB1}}$ at the output of gate G10 is also applied through gate G14 to one input of a gate G15. A second input to the gate G15 is derived from gate G16, which indicates at this time that the flash is not a recall to the operator, since the operator flip-flop FF4 is set, indicating that no operator is involved. A third input to the gate G15 which enables the gate at this time, is derived from the output $\overline{\text{Q0}}$ of the flash control flip-flop FF5. Thus, the gate G15 generates a signal DL. Setting of the flash control flip-flop FF5 also provides an output via gate G17 as a first flash indication signal FD1. Thus, the first flash by the party A is detected in the flash control detector and results in the generation of a first flash signal FD1, a start signal $\overline{\text{ENS}}$ and a dummy load signal $\overline{\text{DL}}$.

The first flash signal FD1 is applied in FIG. 5 via gate G19 to set the stop-tone flip-flop FF7, and thereby disable the gate G4. This eliminates the signal CFTR, causing the CFT relay in FIG. 2 to drop, and thereby disconnecting the conference tone from the ring lead R1.

Figure 6:
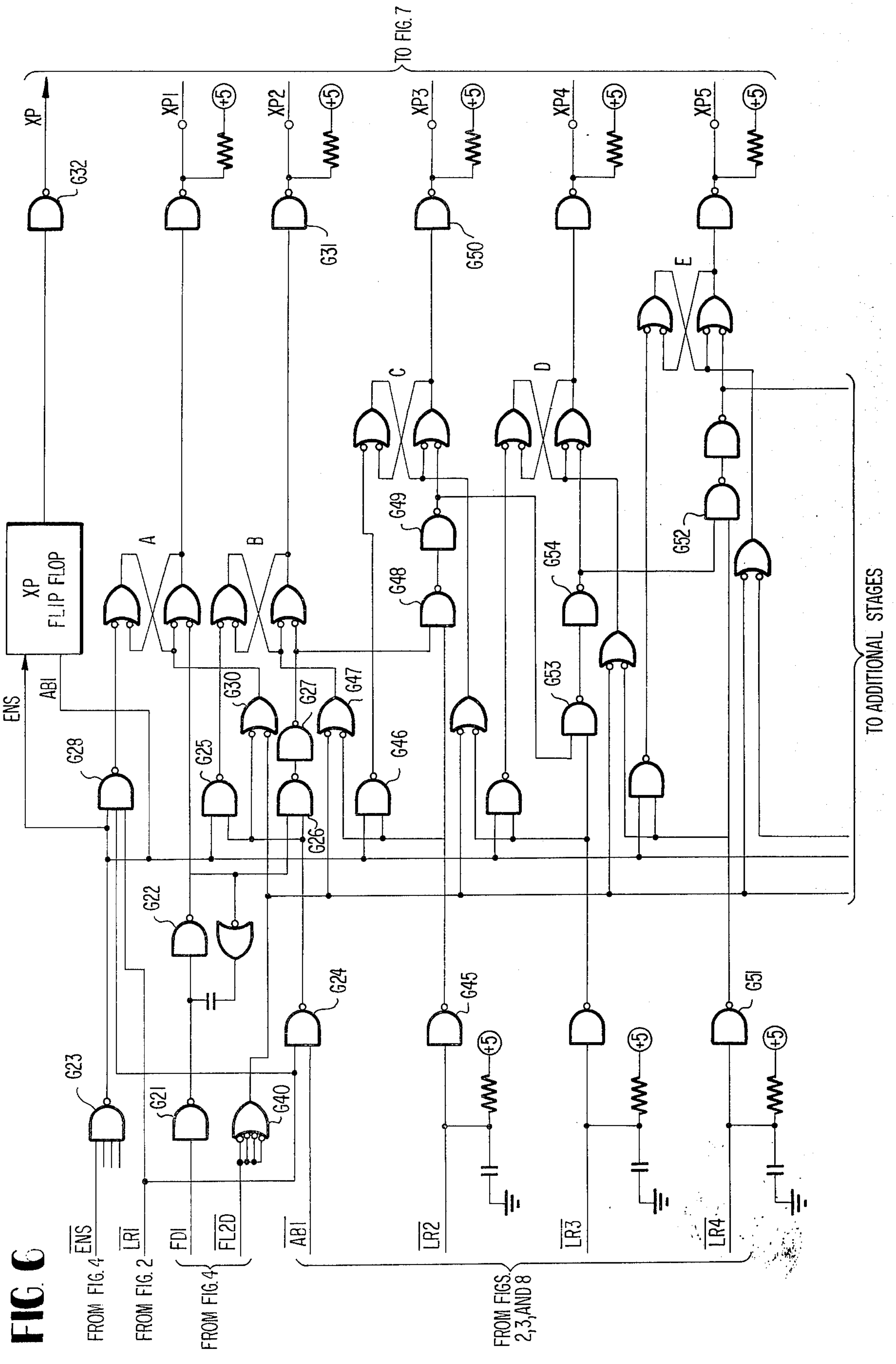
FIG. 6 is a schematic circuit diagram of the conference matrix advance control.

The signal $\overline{\text{ENS}}$ is applied in the conference matrix advance control of FIG. 6 through gate G23 to the gates G25 and G28 connected to the flip-flops A and B of the sequencer. The gate G25 also receives at its second input the output of a gate G24, derived from the signal $\overline{\text{AB1}}$, so as to enable gate G25 to set flip-flop B. The gate G28 is inhibited by the signal $\overline{\text{AB1}}$, thereby preventing the setting of the flip-flop A. The signal FD1 is applied through gate G21 and gate G22 to the flip-flop A and is applied to the flip-flop B through gates G26, also receiving the output of gate G24, and gate G27. The output of gate G24 is also applied through gate G30 to the flip-flop A to ensure the reset condition thereof. As a result, the output of the set flip-flop B will be applied through gate G31 to generate the signal XP2. The signal ENS at the output of gate G23 and the signal AB1 at the output of gate G24 are also applied to an XP flip-flop, thereby providing an output signal XP from the gate G32.

Figure 7A:
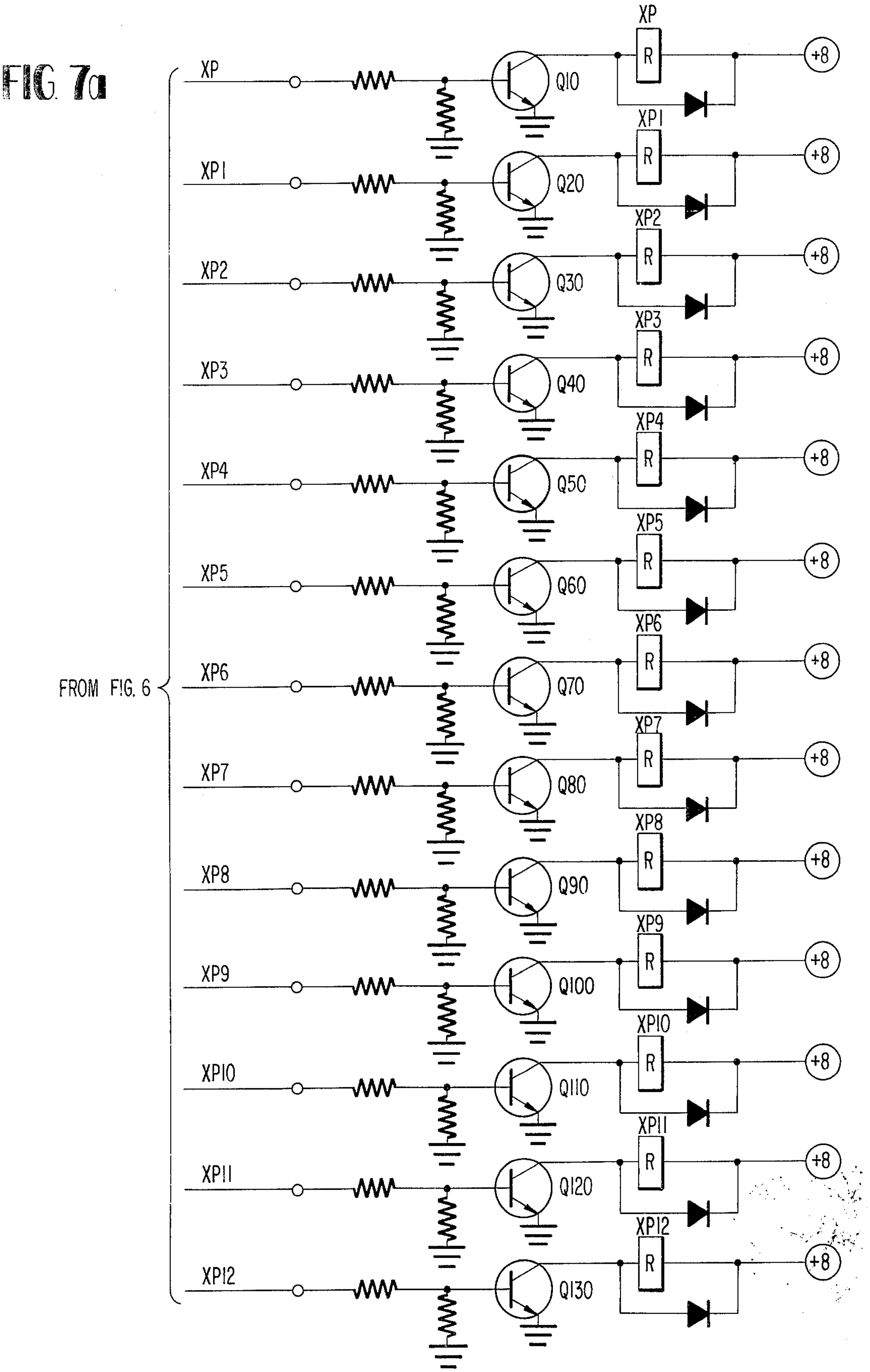
FIG. 7 is a schematic circuit diagram of the conference access matrix.
Figure 7B:
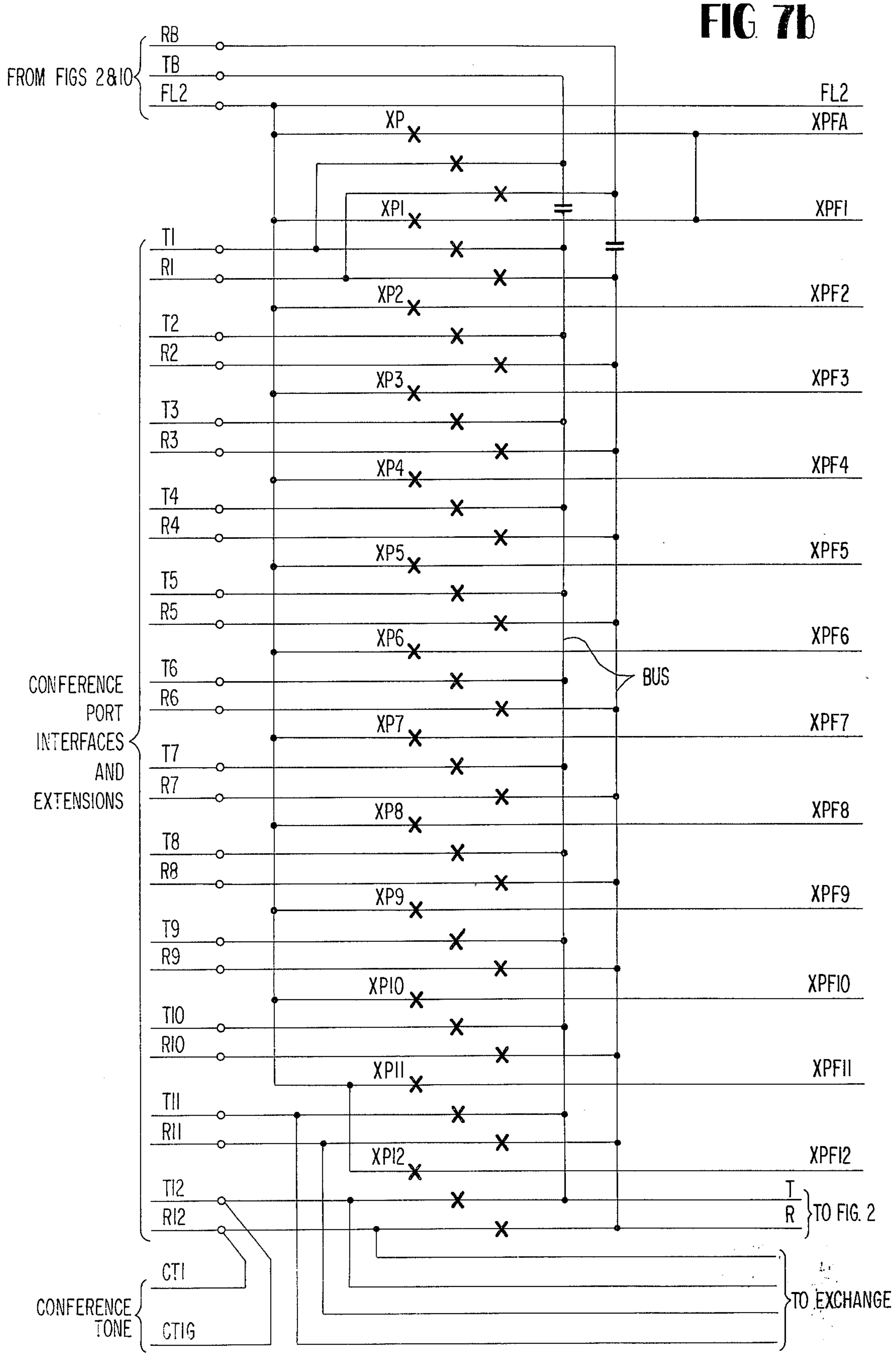

Looking now to the conference access matrix in FIG. 7, the signal XP operates the transistor Q10 to actuate the XP relay, thereby connecting the lead FL2 to the lead XPFA, which is strapped to XPF1. The generation of the signal XP2 causes the transistor Q30 to operate, thereby actuating the XP2 relay to connect the leads TB and RB through the capacitor C1 and C2, respectively, to port No. 2 on leads T2 and R2. At the same time, the signal $\overline{DL}$ is applied to the conference port interface (FIG. 2) to operate the DL relay. This serves to connect a 600 ohm dummy load across the T and R leads on the bus of the access matrix, so that the lines T2 and R2 at the second port provide the appearance of an off-hook condition to the line circuit connected thereto. Thus, the port is connected to a register via normal systems means which then returns dial tone to the bus on leads TB and RB to party A.

Party A now dials the number of party B, the first party to be connected to the conference circuit. As party A dials, the signal $\overline{AB1}$ follows the dial pulses, causing the signal $\overline{DL}$ at the output of gate G15 in FIG. 4 to also follow the dial pulses, and thereby connecting and disconnecting the dummy load from the leads T and R in synchronism with the dialing. Thus, the dial pulses are transferred from party A, through the conference circuit and the line circuit connected to port No. 2, to the register associated therewith and a connection of this line circuit to party B in the conventional manner is accomplished by the exchange. Party A and party B are now in communication from port No. 1 to port No. 2 of the conference circuit via the common bus of the access matrix.

In order to connect both port No. 1 and port No. 2 to the conference amplifiers, party A flashes his switch hook for the second time. Once again, the flash of the switch hook is followed by the signal $\overline{AB1}$, applied through gates G5 and G6 in FIG. 4 to the flip-flop FF3, the output of which is applied to the flash detection control FDC. Detection of a flash will provide a signal FL to the gate G8 in the manner previously indicated, thereby also providing an output from gate G11 to toggle the flash control flip-flop FF5. This time, gate G35 is operated from the flash control flip-flop FF5 and the reset output of an advance flip-flop FF6 to provide a second flash signal FL2R at the output of gate G36. A delayed second flash signal $\overline{FL2D}$ is also provided by gates G37 and G38, the delay being provided by gate G39 and capacitor C7. The signal $\overline{FL2D}$ is applied in FIG. 6 via gate G40 of the advance control to gate G30 and the comparable gates in each stage thereof to ensure that flip-flops which have previously been improperly set are reset at this time.

Figure 2:
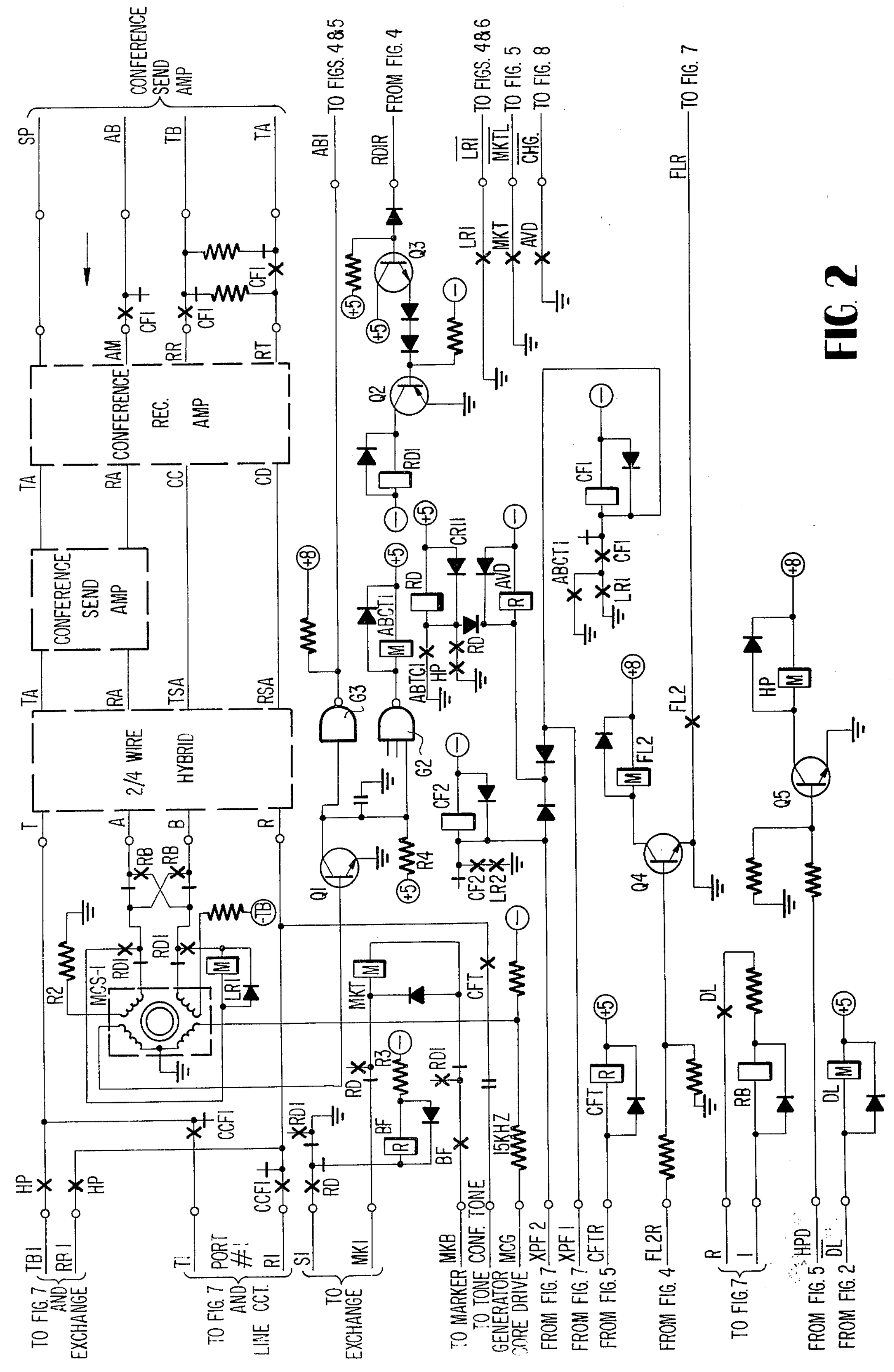
FIGS. 2 and 3 are schematic circuit diagrams of the conference port interface associated with ports provided for party control.

The signal FL2R, on the other hand, is applied to the conference port interface, as seen in FIG. 2, to operate the transistor Q4, thereby actuating the FL2 relay and connecting ground on lead FL2 to the conference access matrix (FIG. 7). Since the relay XP and the relay XP2 have been operated, ground on lead FL2 will be applied via lead XPFA, which is strapped to lead XPF1, and ground is also applied from lead FL2 to lead XPF2. In the conference port interface, as seen in FIG. 2, ground on lead XPF1 serves to set the CF1 relay, which is then held via its own closed contacts and the contacts of the ABCT1 relay. The contacts of the CF1 relay serve to connect party A to the conference send amplifier. The signal XPF2 operates the CF2 relay by its own contacts and the closed contacts of the line relay LR2, which operate at the time party B is connected to port No. 2. Operation of the CF2 relay effects operation of the CCF2 relay, thereby providing connection of port No. 2 through to the conference send amplifier.

Other parties may now be added to the circuit. To accomplish this, party A flashes the switch hook once again. The flashing of the switch hook will cause a momentary interruption of the input to gate G2 in FIG. 2 on the lead FL from the flash detection control FDC, thereby momentarily dropping the relay ABCT1 which removes the holding ground through this relay to the relay CF1. Thus, the relay CF1 drops disconnecting party A from the conference send amplifier to place him again in connection with the core sensor MCS1 for further processing. Of course, at the same time, the flash control flip-flop FF5 is toggled from the output of gate G11 to generate the signal FD1, and the gate G15, which was disabled when flip-flop FF5 was toggled by the second flash, is once again enabled to generate the signal $\overline{DL}$, operating the DL relay and connecting the dummy load across the leads T and R to the bus in the conference access matrix (FIG. 7).

In the advance control, as seen in FIG. 6, a signal $\overline{LR2}$ is now present at the output of gate G45, thereby enabling one input of the gate G48. The signal FD1 and the signal AB1 provide an output from the gate G26 once again so that the output from gate G27 enables the other input of gate G48. The output of gate G48 is applied through gate G49 to one side of flip-flop C, while an output from gate G46 in response to the signal ENS at the output of gate G23 and output of gate G45 are applied to the other side of flip-flop C. Thus, this flip-flop is set to generate the signal XP3 from gate G50.

With respect to the matrix advance control of FIG. 6, it should be noted that the flip-flops A, B, C, etc., will be enabled in numerical order beginning with flip-flop A, and the first available flip-flop will always be chosen in the sequence. In other words, if, during the above-described operation, the flip-flop D had been already set and a party is connected to the No. 4 port, even though a signal LR4 would be present at the output of gate G51, gate G52 at the input of flip-flop E would not be enabled since the FD1 signal would not be applied from the output of gate G49 through gates G53 and G54 to the second input of gate G52, gate G53 not being enabled at this time due to the absence of a signal LR3. Thus, with port No. 3 open, this port will be selected rather than port No. 5.

With generation of the signal XP3, the transistor Q40 is operated in FIG. 7 to actuate the relay XP3 in the access matrix, thereby connecting the leads TB and RB from party A to the leads T3 and R3 of port No. 3. Party A then dials the number of party C and is connected to party C in the manner above described. To effect connection of himself and party C to the conference amplifiers, party A then hookflashes for a second time and the above-described operation occurs once again, causing relay CF1 and CF3 to operate, connecting ports No. 1 and No. 3 to the conference amplifiers, and thereby establishing a conference call between parties A, B, and C. Party A can add other parties by continuing to flash his switch hook and dial the additional parties in the manner above described.

If party B does not answer at the time port No. 1 is connected from leads TB and RB to port No. 2, during the attempt to obtain a first conferee, party A merely hookflashes a second time, which toggles the flash control flip-flop FF5, as already described, inhibiting the gate G15 and eliminating the $\overline{DL}$ signal so as to disconnect the dummy load from the bus in the access matrix and, therefore, from port No. 2. The line circuit then drops the connection in the ESC to the line of party B. Party A then flashes again to toggle the flash control flip-flop FF2, once again generating the first flash signal FD1, the signal $\overline{DL}$ and the signal $\overline{ENS}$. Since party B was not connected to port No. 2 during the previous operation, the relay LR2 will not be operated and, therefore, the sequencer will once again generate the signal XP2 by setting the flip-flop B which was reset upon generation of the signal $\overline{FL2D}$. Party A will then once again be connected to port No. 2 to receive a dial tone and can then dial another party.

If, after setting up a conference connection between parties A, B, and C, party A desires to drop from the connection, the release of party A will be detected by the flash detector control and a signal $\overline{ABR}$ will be generated. The signal $\overline{ABR}$ is applied in FIG. 5 to reset the mark flip-flop FF1, thereby removing the signal HPD from the base of transistor Q5 in FIG. 2 and permitting the RP relay to release. This, of course, opens the HP contacts in lines TB1 and RB1 of port No. 1. At this time, since neither the ABCT1 relay nor the LR1 relay are operated, the CF1 relay will release disconnecting port No. 1 from the conference send amplifier. The RD relay also releases with a delay since the contacts of the ABCT1 relay and HP relay are open, and this disconnects holding ground from the sleeve lead S1 from port No. 1 to the trunk link network in the exchange.

Figure 3:
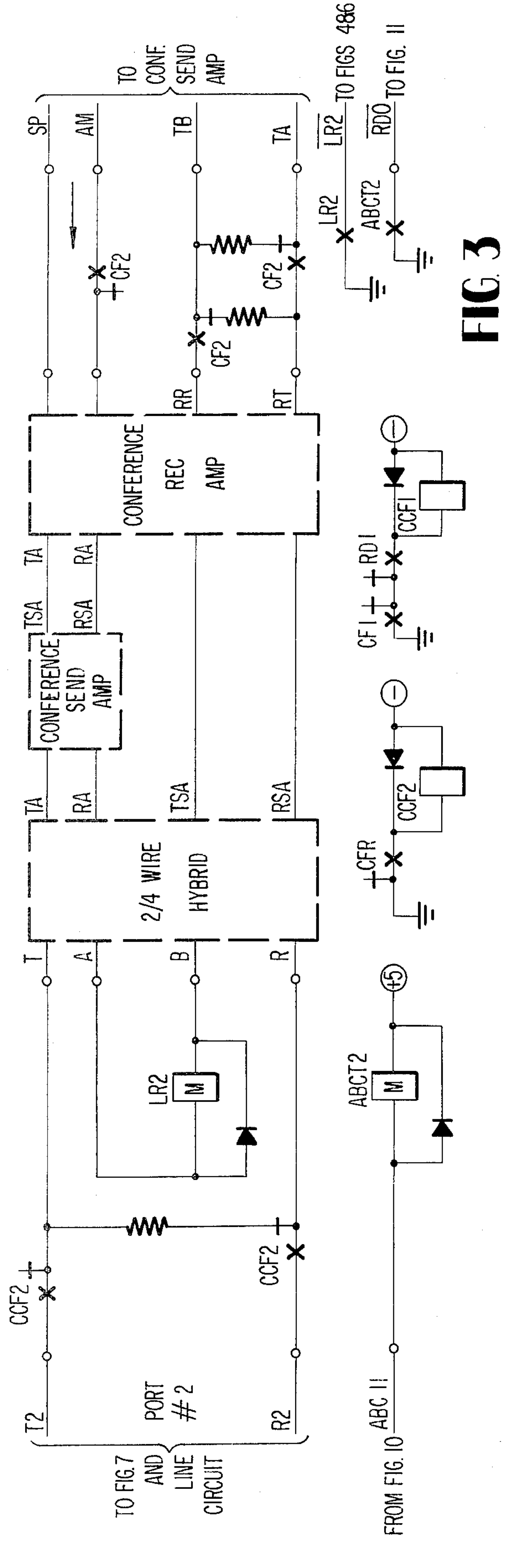

A feature of the present invention resides in the fact that once the initiating party in a dial-up conference releases, control over the conference is automatically transferred to the second party occupying port No. 2. This occurs in the following manner. The signal $\overline{ABR}$, which indicates that the controlling party connected to port No. 1 has released, is applied through gate G59 in FIG. 4 to the control input of a flip-flop FF9, thereby setting the flip-flop. Since a party is connected to port No. 2, the line relay LR2, as seen in FIG. 3, will be operated so that ground will be placed through the closed contacts of this relay as a signal LR2 to the input of gate G60 in FIG. 4. The output of gate G60 is applied as one input of gate G61, which receives on its other inputs the clock signals applied through gate G7, the set output $\overline{Q0}$ of the flip-flop FF9 indicating that party B is to have control, and the set output Q1 of flip-flop FF4 indicating that the operator is not in the conference. Thus, gate G61 will be enabled to follow the clock pulses by the signal $\overline{LR2}$ in the same manner as previously described in connection with gate G6 for first-party control. The output of gate G61 switches the flip-flop FF8 to provide through gates G62 and G63 the timing signal to be applied to the flash detection control FDC.

Figure 4:
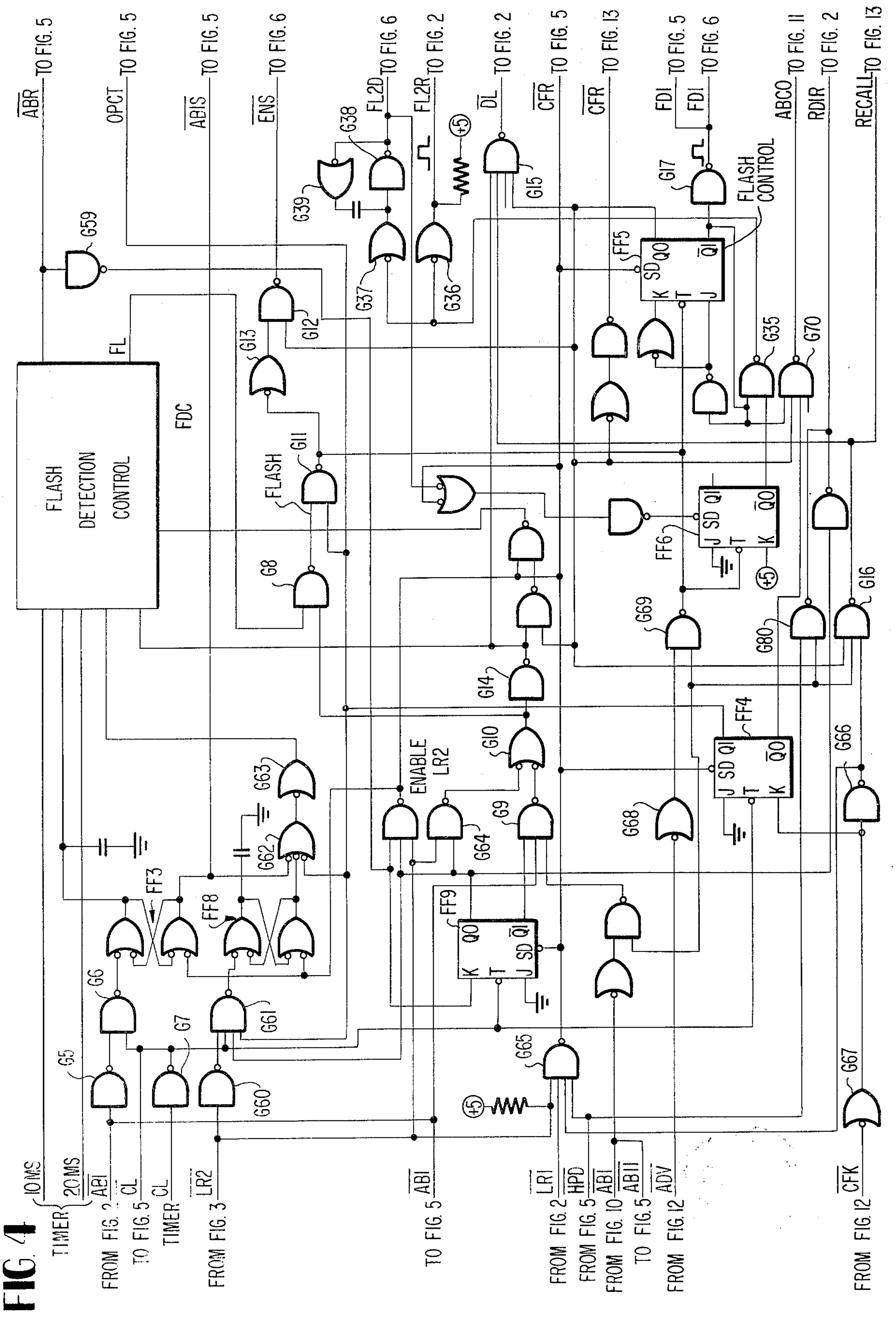
FIGS. 4 and 5 are schematic circuit diagrams of the conference logic control.

As described previously, when the first flash is detected, the gate G15 in FIG. 4 will be enabled to provide the signal $\overline{DL}$ necessary to connect the dummy load to the common bus in the conference access matrix. One of the inputs to the gate G15 is derived from the output of gate G14 which is enabled from the gate G10. The gate G10 was previously enabled in connection with first-party control from the output of gate G9 as a result of the presence of the signal $\overline{AB1}$; however, with second party control, the gate G9 is blocked by the reset output Q1 of the flip-flop FF9 and the gate G64 now provides control over the gate G10 in response to the signal $\overline{LR2}$. The control which is provided by party B is now effected in the same manner as described above in connection with party A. Flip-flop FF9 operates relay RD1 via relay RD1R and prevents port No. 1 from being dialed up due to the open mark lead.

Figure 8:
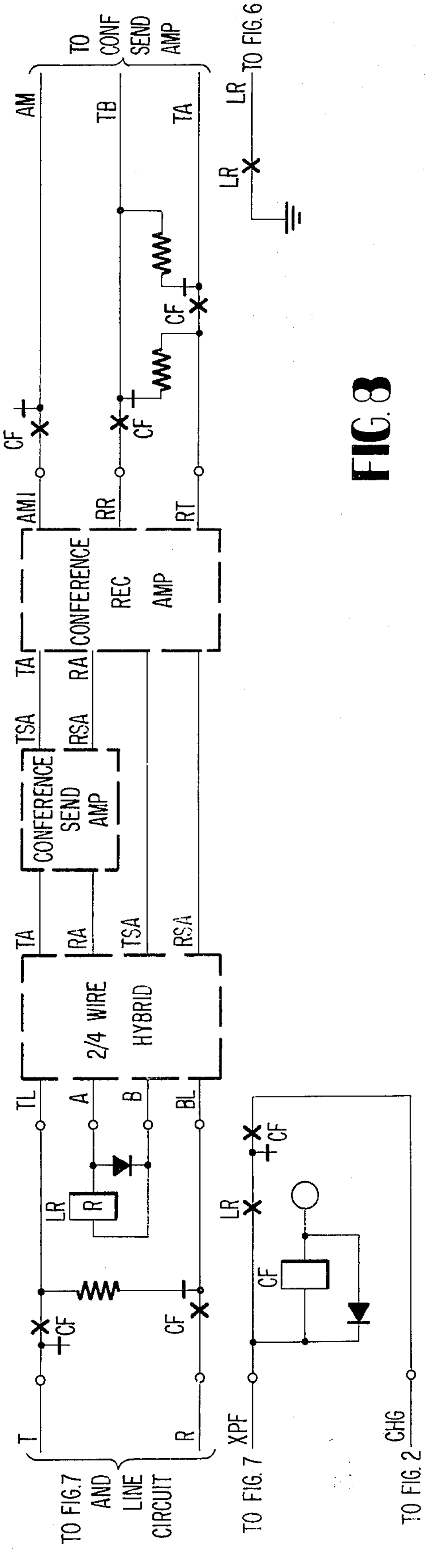
FIG. 8 is a schematic circuit diagram of one exemplary conference port interface extension associated with one of the ports of the conference circuit not allocated to dial-up control or operator control.

If party B releases after party A has released, the conference is terminated in the absence of an operator in the conference. Under these conditions, gate G65 in FIG. 4 receives no input from lines $\overline{LR1}$ or $\overline{LR2}$ indicating that both line relays for ports No. 1 and No. 2 are released; no input is received on line $\overline{HPD}$ indicating that the HP relay is released; and no output is received from gate G66 indicating than an operator is not in the conference. Thus, gate G65 will generate a signal $\overline{CFR}$ disabling flip-flops FF5, FF6, and FF9 and once again setting flip-flop FF4. The signal $\overline{CFR}$ also is applied in FIG. 5 to reset the mark flip-flop FF1 and a flip-flop FF10 associated with port No. 11. At this time the relay AVD in FIG. 2 also releases with release of the line relay LR2 thereby removing ground from the lead $\overline{CHG}$ extending to the conference port interface extensions, as seen in FIG. 8, to release the CF relays thereby disconnecting the lines T and R from the respective ports.

Thus, the conference will be maintained under the control of the initiating party connected to No. 1 until that party releases, and then control will be automatically switched to the party connected to port No. 2. A party cannot be then reconnected to port No. 1 due to the fact that, as seen in FIG. 6, the gate G28 will prevent flip-flop A from being set in the matrix advance control. Once both parties connected to ports No. 1 and No. 2 release, the conference will terminate in the absence of an operator retaining control thereover.

OPERATOR INITIATED CONFERENCE

As already indicated, the conference arrangement of the present invention provides for interconnection of the parties for a conference not only on a dial-up basis by one of the subscribers, but also in response to an operator initiated procedure. There is provided on each operator console a conference key and an advance key, which are used to initiate and control the conference connection. The conference key serves to obtain access to the conference circuit and the advance key operates to produce a signal corresponding to a hookflash by a subscriber to control the sequence of operations necessary to sequentially connect one subscriber after another to the various ports of the conference circuit.

To establish a conference connection between subscribers, the operator depresses her conference key to actuate the operator access matrix 25, thereby requesting connection to the conference circuit. If the conference circuit is available, the matrix 25 will connect the operator to the tip and ring leads T12 and R12 of port No. 12 of the conference circuit, as seen in FIG. 9. At the same time, the conference key interface (FIG. 12)

generates a signal $\overline{CFK}$, which is applied through gate G67 in FIG. 4 to reset the normally set flip-flop FF4, thereby indicating that the operator is in the conference. As a result, the output Q1 of flip-flop FF4 will be applied to inhibit gate G11 thereby preventing further control in response to the output of the flash detection control FDC, and a signal OPCT is also provided from this output of flip-flop FF4 through gate G19 in FIG. 5 to toggle the stop tone flip-flop FF7, thereby preventing enabling of gate G4 to provide conference tone in connection with port No. 1. At this time, RD1 relay is operated via RD1R to switch port No. 1 from terminating to originating and busy port No. 1 against incoming calls by opening the mark lead.

The output of gate G67 in FIG. 4 in response to the signal $\overline{CFK}$ is also applied through gate G66 to the input of gate G65 indicating that the operator has initiated the conference and thereby preventing generation of the conference release signal $\overline{CFR}$.

To bring parties into the conference circuit, the operator depresses her advance key generating a signal $\overline{ADV}$ in FIG. 4 at the input of gate G68. This enables gate G69, whose other input is derived from the Q0 output of the presently reset flip-flop FF4 to toggle the flash control FF5, thereby generating the signal FD1 at the output of gate G17 in the manner previously described in connection with dial-up conference. At the same time the signal $\overline{DL}$ is generated at the output of gate G15, and the output of gate G69 also enables gate G12 via gate G13 to generate the signal $\overline{ENS}$. Thus, the dummy load is connected to the conference access matrix on lines T and R in FIG. 7 as a result of operation of the DL relay in FIG. 2 and the matrix advance control operates flip-flop A and flip-flop XP to generate signals XP and XP1. The relays XP and XP1 in FIG. 7 are then operated to connect the operator from port No. 12 via the common bus to port No. 1.

The operator then receives dial tone and dials or keys the number of the party desired, and when the party answers, the operator may converse via the common bus in the conference access matrix with this party to indicate that a conference connection is being set up. The operator then depresses her advance key once again enabling gate G69 via gate G68 to toggle the flash control flip-flop FF5. In the manner previously described, gate G35 connected to the flash control flip-flop FF5 and advance control flip-flop FF6 is then enabled to generate the signals FL2R via gate G36 and $\overline{FL2D}$ via gates G37 and G38, resulting in connection of port No. 1 to the conference send amplifiers in the manner already described. At the same time, a gate G70 is enabled generating the signal ABCO, which serves to operate the ABCO relay in FIG. 11. With operation of relay ABCO, the CF12 relay is operated, thereby completing connection of the operator via port No. 12 to the conference send amplifier through the closed contacts of relay CF12 in lines T12 and R12 and lines AM, RR, and RT.

Further parties are then added to the conference by the operator depressing the advance key once again to toggle the flash control flip-flop FF5 from the output of gate G69. This removes the signal ABCO to allow the ABCO relay and CF12 relay to release, and the signals $\overline{ENS}$, $\overline{DL}$, and FD1 are again generated from the output of gates G12, G15, and G17, respectively. This operation is continued in the manner already described to connect a second party to port No. 2, whereby actuation of the advance key by the operator again connects the second subscriber from port No. 2 to the conference send amplifiers and again automatically connects the operator via port No. 12 to the conference send amplifiers. This operation is then continued until all parties have been connected to the conference.

Once all parties have been connected to the conference, the operator may release and the flip-flop FF4 will at this time be set once again as signal $\overline{CFK}$ disappears with operator release. Gate G65 is not enabled to generate the release conference signal $\overline{CFR}$ since at least one of the line relays LR1 or LR2 will be enabled providing an input $\overline{LR1}$ or $\overline{LR2}$ to that gate.

It will be noted from FIG. 10 that port No. 11 includes a core sensor MCS2 and therefore also may serve as a trunk port in addition to port No. 1. In this way, it is possible for the operator to connect an incoming trunk call to the conference circuit by merely dialing a special digit or group of digits designating port No. 11. This digit combination is detected in the exchange causing the trunk marker to mark lead MKB in FIG. 10 to operate the MKT11 relay from lead MK11. Ground is then applied through the closed contacts of the MKT11 relay on line $\overline{MKT11}$ to FIG. 5 and thereby toggles the flip-flop FF10 to generate an output HP11 from gate G71. The signal HP11 is applied to FIG. 11 at the input of transistor Q41 to operate the HP11 relay thereby connecting the tip and ring leads TB and RB to the core sensor MCS2. This connection to the incoming trunk will be sensed by the core sensor MCS2 thereby enabling the transistor Q21 in FIG. 10 to provide an output to gates G72 and G73, generating signals $\overline{AB11}$ and $\overline{ABC11}$.

The signal $\overline{ABC11}$ is applied to FIG. 3 to operate the ABCT2 relay thereby connecting ground through the closed contacts of this relay to line $\overline{RDO}$. The signal $\overline{RDO}$ is applied in FIG. 11 to operate the CF11 relay and the RDO relay. The CF11 relay has contacts which connect port No. 11 to the conference send amplifier and the RDO relay connects ground to the sleeve leads S11 to hold the connection and also disable the busy/-free relay BF to prevent further access to port No. 11. Ground is also applied in FIG. 10 through the contacts of the operated $\overline{CF11}$ relay to the line $\overline{LR11}$ in FIG. 6 to indicate that port No. 11 is occupied.

If it is desired to modify the arrangement so that only a single special digit combination is required for the conference circuit, i.e., a digit combination to be used by a party to access the conference circuit to establish a conference connection on a dial-up basis and the same special digit combination to be used by the operator to connect an incoming trunk to port No. 11, circuitry may be provided in the exchange to detect this special digit combination along with an operator class of service, indicating the operator has initiated the conference to automatically connect the incoming trunk to port No. 11. This would eliminate the need to provide two special digit combinations for the conference circuit and thereby simplify the operation.

When a conference connection has been initiated by the operator, the signal $\overline{HPD}$ indicating that the HP relay is not operated as a result of a party acquiring the conference circuit for dial-up purposes in combination with the Q0 output from flip-flop FF4 in FIG. 4 enables gate G80 to generate the signal RD1R. The signal RD1R is applied in FIG. 2 through transistors Q3 and Q2 to operate the RD1 relay. The contacts of the RD1 relay associated with the core sensor MCS1 of port No. 1 connect the line relay LR1 across the loop and thereby eliminate the core sensor. Thus, while the operator is in the conference, port No. 1 corresponds essentially in configuration to ports No. 2 through No. 10, as seen, for example, in FIG. 8. However, since a party will be connected to port No. 1, this party may flash his switch hook to recall the operator via the relay LR1.

When the party connected to port No. 1 flashes his switch hook, the signal LR1 similar to AB1 at the dialed-up sequence follows the hook switch flash, which is then detected by the flash detection control FDC in FIG. 4 thereby toggling the flash control flip-flop FF5 in the manner previously described via gates G8 and G11. As a result, gate G16 in FIG. 4 is enabled by the output from gate G66 in combination with the Q0 output of the operator control flip-flop FF4 and the Q0 output of the flash control flip-flop FF5. A recall signal RECALL is provided at the output of gate G16 to the conference lamp interface, as seen in FIG. 13. As will be described, selective flashing of the key for the operator which originally initiated the conference connection will notify the operator of a recall and that her services in connection with the conference are once again required.

FIG. 12 illustrates a representative portion of the conference key interface by which the operator generates the conference request signal $\overline{CFK}$ that will be applied to gate G67 in FIG. 4. Only two operator interface circuits are shown in FIG. 12; however, it will be understood that one interface circuit will be provided for each operator. When operator No. 1 enters a loop, for example, a position signal POS1 is generated and applied to a light switch LS1 in the interface for operator No. 1 operating the transistor 106 to enable the flip-flop FF15 via gates 80 and 81. The flip-flop FF15 is then toggled by generation of the signal CFK1 when the operator depresses the conference key, the signal CFK1 being applied through a second light switch LS2 via gates G84, G85, and G86. As a result, a conference request signal $\overline{CF1}$ is generated at the output of the flip-flop FF15.

All of the operator interfaces are identical so that a conference request signal will be generated at the output of each interface circuit when the associated operator depresses her conference key. Each of these conference request outputs is applied through an OR gate G87 and a gate G88 to provide the conference signal $\overline{CFK}$, to be applied to gate G67 in FIG. 4. The signal $\overline{CFK}$ is also applied via gates G89 and G90 as an inhibit signal INH to the gate G85 and all corresponding gates in the other operator interfaces so as to inhibit generation of a conference request signal from any other interface. Thus, only a single operator at a time may obtain access to the conference circuit.

In a manner similar to generation of the conference request signal $\overline{CFK}$, the advance signal $\overline{ADV}$, which is applied to gate G68 in FIG. 4 is generated when an operator depresses the advance key generating a signal ADV which is applied to the light switch LS3 in the interface, as seen in FIG. 12. This enables gate G82 via gate G83 to provide an output B which is applied through an OR gate G91 along with the other corresponding outputs from the other interfaces so that the advance signal $\overline{ADV}$ is provided at the output of gate G92.

FIG. 13 illustrates a typical conference lamp control for controlling the lamps in the conference keys and advance keys on the consoles of the various operators. While a single lamp control is illustrated in the figure, it will be understood that the lamp controls for the other operators are identical to the one illustrated and are connected in parallel therewith.

The signal CF1 from FIG. 12 is applied to a flip-flop FF20 and an advance signal AVL1 generated upon depression of the advance key by operator No. 1 is provided through a gate G100 to provide illumination of the advance key light by the signal ADVL. The outputs of the flip-flop FF20 are selectively connected to gates G101 through G104, the output of gate G101 being connected to the input of gate G100 and the outputs of gates G102 – G104 being connected to an OR gate G105. The gates G101 through G104 also receive inputs from gates G106 through G110. The gate G106 provides at its output a recall signal REC, while the gate G107 provides a not-recall signal $\overline{REC}$. Gate G108 provides a 120 IPM signal and the gate G109 provides a 30 IPM signal. Gate G110 provides a signal CHG for steady-state illumination.

The logic combination of the various inputs to the gates G101 through G104 provide (1) a 120 IPM signal at the output of gate G101 in response to recall where that operator originally initiated the conference connection as indicated by the set condition of flip-flop FF20, (2) a 30 IPM signal at the output of gate G102 to an operator which has not initiated the conference connection and where there is no recall, (3), a 120 IPM signal at the output of gate G103 for recall to an operator which has not initiated the conference connection, and (4) a steady-state output signal from gate G104 for the operator which initiated the conference connection as indicated by the set condition of flip-flop FF20. Thus, for the operator who initiated the conference connection, the conference key will have a steady illumination and the advance key will flash at 120 IPM for recall. For all other operators, their conference keys will flash at 30 IPM where there is no recall and 120 IPM if there is recall. The flashing of the conference keys of the operators who have not initiated the conference call at 120 IPM during recall permits other operators to enter into the conference, if the operator who initiated the conference is busy at that time. By flashing the conference keys of the operators who have not initiated the conference call at 30 IPM, they are placed on notice that the conference circuit is busy. The output from OR gate G105 provides energizing control for the conference lamp in the conference key at the operator console and the output from gate G101 is applied through gate G100 to control the lamp in the advance key of the operator console.

The conference release signal $\overline{CFR}$ is applied through gates G111 and G112 to reset flip-flop FF20 and the flip-flops in the other operator lamp controls when the conference is terminated.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In a private automatic branch exchange including a plurality of subscriber line circuits and at least one operator position circuit, a conference circuit for interconnecting a plurality of subscribers in a common communication comprising an access matrix including a plurality of ports formed by respective transmission pairs, a common bus and switching means for selectively connecting said ports to said common bus; advance control means responsive to the occupied condition of said ports for actuating said switching means to connect non-occupied ports to said common bus in sequential order; core sensing means connected to one of said ports to detect line conditions, said one port being directly connected to said common bus; logic circuit means responsive to said core sensing means detecting a hookflash signal for actuating said advance control means to connect the next non-occupied port in said sequence to said common bus, conference amplifiers associated with each port, said switching means including first switching means associated with each port for selectively connecting that port to said common bus, and second switching means associated with each port for selectively connecting that port to a conference amplifier; said logic circuit means including sequence control means for operating said advance control means to operate a select one of said first switching means and a corresponding one of said second switching means in response to alternate detected hookflash signals, said logic circuit means including a hookflash detection circuit connected to said core sensing means, the output of said hookflash detection circuit being connected to said sequence control means, and wherein a line relay is connected to each of said ports via said second switching means, said logic circuit means including party control means for connecting said hookflash detection circuit to the line relay of only a single designated port other than that to which said core sensing means is connected in response to release of the subscriber from said core sensing means.

2. A conference circuit as defined in claim 1 wherein said operator position circuit is operatively associated with a prescribed one of said ports, each of said ports being connected by a line circuit to said exchange.

3. A conference circuit as defined in claim 2, including operator control means for connecting said operator position circuit to said sequence control means and means responsive to said operator control means for inhibiting the output of said hookflash detection circuit while said operator position circuit is connected to said sequence control means.

* * * * *